US012619865B2

(12) United States Patent
Choque et al.

(10) Patent No.: US 12,619,865 B2
(45) Date of Patent: May 5, 2026

(54) DECOUPLING MEMORY AND COMPUTATION TO ENABLE PRIVACY ACROSS MULTIPLE KNOWLEDGE BASES OF USER DATA

(71) Applicant: Capital One Services, LLC, McLean, VA (US)

(72) Inventors: Omar Florez Choque, Oakland, CA (US); Rui Zhang, New York, NY (US); Erik T. Mueller, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 1179 days.

(21) Appl. No.: 17/001,746

(22) Filed: Aug. 25, 2020

(65) Prior Publication Data

US 2022/0067500 A1     Mar. 3, 2022

(51) Int. Cl.
| | |
|---|---|
| *G06N 3/08* | (2023.01) |
| *G06F 40/35* | (2020.01) |
| *G06N 5/02* | (2023.01) |
| *G06Q 30/0282* | (2023.01) |

(52) U.S. Cl.
CPC .............. *G06N 3/08* (2013.01); *G06F 40/35* (2020.01); *G06N 5/02* (2013.01); *G06Q 30/0282* (2013.01)

(58) Field of Classification Search
CPC ........ G06N 3/08; G06N 5/02; G06Q 30/0282; G06F 40/35
See application file for complete search history.

(56) References Cited

U.S. PATENT DOCUMENTS

| | | | | |
|---|---|---|---|---|
| 5,765,028 | A | * | 6/1998 | Gladden ................ G06N 5/025 |
| | | | | 706/14 |
| 10,032,451 | B1 | | 7/2018 | Mamkina et al. |
| 2004/0078191 | A1 | * | 4/2004 | Tian ...................... G06F 40/263 |
| | | | | 704/9 |
| 2016/0224803 | A1 | * | 8/2016 | Frank .................. G06F 21/6245 |
| 2018/0032861 | A1 | | 2/2018 | Oliner et al. |
| 2018/0165554 | A1 | | 6/2018 | Zhang et al. |
| 2018/0357240 | A1 | | 12/2018 | Miller et al. |

(Continued)

OTHER PUBLICATIONS

Miller, Alexander et al. "Key-Value Memory Networks for Directly Reading Documents" 2016 [Online] DOwnloaded Jan. 31, 2024 (Year: 2016).*

(Continued)

*Primary Examiner* — Ben M Rifkin
(74) *Attorney, Agent, or Firm* — TROUTMAN PEPPER LOCKE LLP; Christopher J. Forstner; John A. Morrissett

(57) ABSTRACT

Systems and methods are provided herein for utilizing a knowledge base to improve online automated dialogue responses based on machine learning models. Contextual customer data stored in external memory may be used for retraining a machine learning model to incorporate new observations into the model and to reduce bias and/or improve fairness in associated automated responses without having to retrain an entire memory architecture. The disclosed technology may improve the accuracy of machine learning models by using potentially private contextual customer data to inform the model while eliminating the ability of an intruder to access such data when the model is utilized in cloud-based services.

19 Claims, 6 Drawing Sheets

(56)        References Cited

U.S. PATENT DOCUMENTS

2019/0103092 A1    4/2019  Rusak et al.
2019/0355346 A1    11/2019  Bellegarda

OTHER PUBLICATIONS

Welleck, Sean et al. "Dialogue Natural Language Inference" Jan. 18, 2019. [Online] Downloaded Jan. 31, 2024 (Year: 2019).*
Jang, Myeongjun, Seo Seungwan, and Pilsung Kang. "Recurrent neural network based semantic variational autoencoder for Sequence to Sequence learning" 2019 [Online] Downloaded Jan. 31, 2024 (Year: 2019).*
Kim, Byeongchang, Hyunwoo Kim, Gunhee Kim. "Abstractive Summarization of Reddit Posts with Multi-level Memory Networks" Apr. 9, 2019 [Online] Downloaded May 6, 2024 https://arxiv.org/pdf/1811.00783 (Year: 2019).*
Wu, Wenmin et al. "Improving performance of tensor based context aware recommenders using Bias Tensor Factorization with context feature auto-encoding" https://www.sciencedirect.com/science/article/pii/S0950705117301909 (Year: 2017).*
Srivastava, Tavish. "Repolicating Human Memory Structures in Neural NEtworks to Create Precise NLU algorithms" Jul. 26, 2020.

[Online] Downloaded May 6, 2024 https://www.analyticsvidhya.com/blog/2018/04/replicating-human-memory-structures-in-neural-networks-to-create-precise-nlu-algorithms/ (Year: 2020).*
Turney, Peter. "Technical Note: Bias and Quantification of Stability" 1995 [Online] Downlaoded Nov. 7, 2024 https://link.springer.com/article/10.1023/A:1022682001417 (Year: 1995).*
Aakur, Sathyanarayanan Narasimhan, "Beyond Labels and Captions: Contextualizing Grounded Semantics for Explainable Visual Interpretation," University of South Florida, ProQuest Dissertations Publishing (2019) (138 pages).
Simoes, D. et al., "Multi-agent actor centralized-critic with communication," vol. 390 (May 2020) pp. 40-56.
Schuller, Bjorn, "Voice and speech analysis in search of states and traits," Computer Analysis of Human Behavior (2011) (26 pages).
Sobkowicz, P. et al., "Opinion Formation in the Social Web: Agent-based Simulations of Opinion Convergence and Divergence in Sub-Communities," Agents and Data Mining Interaction, International Workshop, ADMI (May 2011) (13 pages).
Rasanen, O. et al., "Is infant-directed speech interesting because it is surprising ?—Linking properties of IDS to statistical learning and attention at the prosodic level," Cognition, vol. 178 (Sep. 2018) (38 pages).

* cited by examiner

DECOUPLING MEMORY AND COMPUTATION TO ENABLE PRIVACY ACROSS MULTIPLE KNOWLEDGE BASES OF USER DATA

FIELD

The disclosed technology relates to training machine learning models using potentially biased and/or sensitive contextual user data to improve response fairness without compromising user privacy when the model is used with cloud-based services.

BACKGROUND

The deployment of deep learning solutions in cloud-based services often involves regularly re-training neural network models to improve or refine the model and/or to increase the accuracy of the service. In certain cloud-based machine-learning applications, such as intelligent automated virtual assistants, a neural network model can be improved by using available contextual data for the training and/or re-training. Training a neural network model typically involves mapping one or more functions from inputs to outputs of the model using a training dataset while keeping track of errors. The errors may be utilized to update weights that are applied to the various neural network connections and such updates may be iteratively made until the model is considered good enough and/or the error reduction process has stalled. The process of training/re-training a neural network can be computationally complex, time-consuming, and technically challenging. In most cases, therefore, such training/re-training (and testing) of a neural network model is done offline before being deployed for use in cloud-based services.

The integration of a knowledge base into a neural dialogue agent is one of the key challenges in conversational artificial intelligence. The use of memory for encoding knowledge base information can be effective in generating more fluent and informed responses. Unfortunately, such memory can be biased and may become full of latent representations during training, so the most common strategy is to randomly overwrite old memory entries. Existing neural dialogue agents struggle to utilize structured data stored in a knowledge base, and often assume that the dialogue history carries the information needed to provide an answer, which can limit the value and accuracy of information produced.

Intelligent automated virtual assistants, chatbots, etc., for example, utilize machine learning to interpret dialogue/chat and provide automated contextual information to the customer. Some learning models may utilize multiple knowledge bases (calendars, locations, weather, etc.) to solve different problems and/or to enhance the accuracy of the response. Potentially sensitive contextual customer data in the knowledge base (gender, age, location, etc.) may be used to improve the accuracy of the model, but the use of such information may create biasing and/or privacy concerns. Prior methods have dealt with such issues by using encryption and other brute-force methods to mask sensitive customer data.

There exists a need for flexible training and/or re-training of deep learning models using contextual data to improve fairness in virtual assistant dialogue results without creating customer privacy issues and without retraining the entire neural network memory architecture. Embodiments of the present disclosure are directed to this and other considerations.

SUMMARY

Disclosed herein are systems and methods for utilizing customer contextual data securely stored in one or more knowledge bases to improve online automated dialogue responses based on machine learning models that may be initially trained offline. Certain implementations may utilize external memory for training models, for example, to incorporate new observations without having to retrain the entire memory architecture.

Consistent with the disclosed embodiments, a system is provided for adapting a response of a trained neural network using customer contextual data while controlling fairness in the corresponding response. The system includes one or more processors, a trained neural network, one or more knowledge bases, and a contextual trainer memory module in communication with the trained neural network and the one or more knowledge bases. The contextual trainer memory module is configured to: translate contextual data values from the one or more knowledge bases into keys; generate gradients based on the keys; generate a Fair Region vector, the Fair Region vector including a subset of the gradients selected to provide a predetermined distribution over the contextual data values. The system includes memory in communication with the one or more processors and storing instructions that, when executed by the one or more processors, cause the system to: receive, by the trained neural network, an input observation x; generate, by the trained neural network, a latent activation representation h based on the input observation x; query the contextual trainer memory module with the latent activation representation h to generate an associated Fair Region vector; combine the latent activation representation and the Fair Region vector, and output a predicted sequence § based at least in part on the combined latent activation representation and the Fair Region vector.

Consistent with the disclosed embodiments, a contextual trainer is provided. The contextual trainer includes one or more processors, and memory in communication with the one or more processors and storing instructions that, when executed by the one or more processors, cause the contextual trainer to receive, from a trained neural network, a latent activation representation h based on an input observation x received by the trained neural network; translate contextual data values from one or more knowledge bases into keys; generate gradients based on the keys; generate a Fair Region vector, the Fair Region vector comprising a subset of the gradients selected to provide a selectable distribution over the contextual data values; combine the latent activation representation h and the Fair Region vector; and output a predicted sequence ý based at least in part on the combined latent activation representation and the Fair Region vector.

Consistent with the disclosed embodiments, a method is provided for adapting a trained neural network response using customer contextual data while controlling fairness in the corresponding response. The method includes: translating contextual data values from one or more knowledge bases into keys using a contextual trainer memory module; generating gradients based on the keys; generating a Fair Region vector, the Fair Region vector comprising a subset of the gradients selected to provide a predetermined distribution over the contextual data values; receiving, by a trained neural network, an input observation x; generating, by the trained neural network, a latent activation representation h based on the input observation x; querying the contextual trainer memory module with the latent activation representation h; combining the latent activation representation and the Fair Region vector; and outputting a predicted sequence ý based at least in part on the combined latent activation representation and the Fair Region vector.

Certain implementations of the disclosed technology may improve machine learning models by using potentially private contextual customer data to inform the model without creating privacy issues. In certain implementations, the customer data is securely stored locally in a knowledge base for revising automated dialogue responses and/or selective re-training of encoders without exposing such data (i.e., without providing access to the data where access would not otherwise be available) when the model is utilized in cloud-based services. Certain implementation of the disclosed technology enables the use of customer data to improve online automated dialogue responses while eliminating the ability of an intruder to access such data.

In accordance with certain exemplary implementations of the disclosed technology, a system is provided for training and adapting a response of a neural network using customer contextual data without compromising customer privacy. The system includes one or more processors, a trained neural network, one or more knowledge bases configured to securely store contextual data related to a customer, and a contextual trainer memory module in communication with the trained neural network and the one or more knowledge bases. The contextual trainer memory module is configured to: translate contextual data values from the one or more knowledge bases into keys; generate gradients based on the keys; generate a Fair Region vector, the Fair Region vector including a subset of the gradients selected to provide a predetermined distribution over the contextual data values. The system includes memory in communication with the one or more processors and storing instructions that, when executed by the one or more processors, cause the system to: receive, by the trained neural network, an input observation x; generate, by the trained neural network, a latent activation representation h based on the input observation x; query the contextual trainer memory module with the latent activation representation h to generate an associated Fair Region vector; combine the latent activation representation and the Fair Region vector, and output a predicted sequence § based at least in part on the combined latent activation representation and the Fair Region vector. In certain exemplary implementations, the contextual data values include customer private data and the predicted sequence ý is a word-by-word concatenation based on the contextual data values, however, the predicted sequence ý is devoid of the customer private data.

Consistent with the disclosed embodiments, a contextual trainer is provided. The contextual trainer includes one or more processors, and memory in communication with the one or more processors and storing instructions that, when executed by the one or more processors, cause the contextual trainer to: receive, from a trained neural network, a latent activation representation h based on an input observation x received by the trained neural network; receive from, one or more knowledge bases in communication with the contextual trainer, contextual data values comprising private customer data; translate contextual data values from one or more knowledge bases into keys; generate gradients based on the keys; generate a Fair Region vector, the Fair Region vector comprising a subset of the gradients selected to provide a selectable distribution over the contextual data values; combine the latent activation representation h and the Fair Region vector; and output a predicted sequence § based at least in part on the combined latent activation representation and the Fair Region vector, where the predicted sequence ŷ is devoid of the customer private data.

Consistent with the disclosed embodiments, a method is provided for adapting a trained neural network response using customer contextual data comprising private customer data without compromising customer privacy. The method includes: translating contextual data values from one or more knowledge bases into keys using a contextual trainer memory module; generating gradients based on the keys; generating a Fair Region vector, the Fair Region vector comprising a subset of the gradients selected to provide a predetermined distribution over the contextual data values; receiving, by a trained neural network, an input observation x; generating, by the trained neural network, a latent activation representation h based on the input observation x; querying the contextual trainer memory module with the latent activation representation h; combining the latent activation representation and the Fair Region vector; and outputting a predicted sequence ŷ based at least in part on the combined latent activation representation and the Fair Region vector, where the predicted sequence ŷ is devoid of the customer private data. Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology.

DETAILED DESCRIPTION

Systems and methods are disclosed herein for training neural network models offline and using contextual customer data to improve fairness in the response dialogue of an automated assistant without exposing such data or compromising customer privacy when the model is deployed online. Certain implementations may reduce biasing in the resulting dataset. In accordance with certain exemplary implementations of the disclosed technology, an external and trainable memory component (contextual trainer) is disclosed herein to decouple a trained encoder component from its external memory to enable the use of (potentially sensitive) contextual data without creating associated privacy concerns.

Certain additional details of the disclosed technology are further discussed in the following publications, which are incorporated herein by reference as if presented in full:

1) "Aging Memories Generate More Fluent Dialogue Responses with Memory Networks," Omar U. Florez and Erik Mueller, arXiv:1911.08522, Nov. 19, 2019;

2) "On the Unintended Social Bias of Training Language Generation Models with Data from Local Media," Omar U. Florez, arXiv:1911.00461, Nov. 1, 2019;

3) "Learning to Remember Rare Events," Łukasz Kaiser et al, arXiv:1703.03129, Mar. 9, 2017;

4) "A Survey on Bias and Fairness in Machine Learning," Ninareh Mehrabi et al, arXiv:1908.09635v2, Sep. 17, 2019.

Implementations of the disclosed technology may enable a more flexible and private re-training of a neural model, keeping contextual information stored locally in a knowledge base (i.e., the contextual information is stored in a database on-premises and not in the cloud). The disclosed technology may provide the further benefit of enabling generic neural encoders to be enhanced with specific customer information while reducing or eliminating associated biasing or privacy issues.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
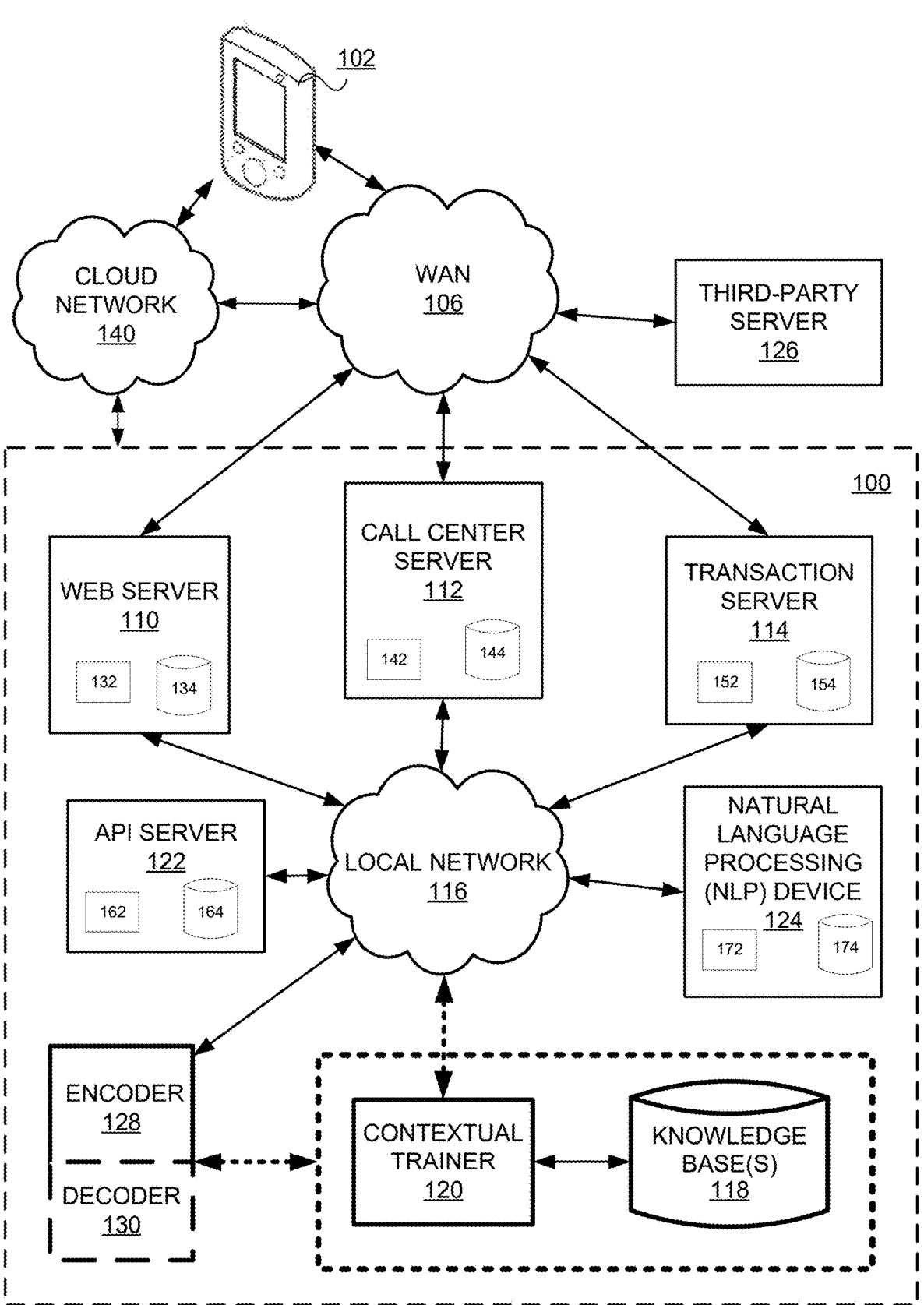
FIG. 1 is a block diagram of an example intelligent automated virtual assistant system, in accordance with an example implementation of the disclosed technology.

FIG. 1 is a block diagram of an example intelligent automated virtual assistant system 100 that may be configured to perform one or more processes to adaptively generate automated responses based on an evolving context associated with customer interactions, orders, goods, services, etc. The components and arrangements shown in FIG. 1 are not intended to limit the disclosed embodiments as the components used to implement the disclosed processes and features may vary.

In certain example implementations, the system 100 may interact with a user device 102 via a wide-area network (WAN) 106 and/or a cloud network 140. Certain components of the system 100 (such as the combination 138 of the contextual trainer 120 and knowledgebase(s) 118) and the cloud network 140 may be utilized differently depending on two operating modes: (1) training; and (2) inference. For example, during the training mode, a machine learning model associated with the encoder 128 and/or decoder 130 may be trained using the contextual trainer 120 and knowledgebase(s) 118 on-premises without utilizing the cloud network 140. However, during the inference mode after the encoder 128 (and/or decoder 130) has been trained and the associated trained machine learning model is used in production when the system 100 is taken "live," all (or part of) the functions/components of the system 100 may be run in the cloud via the cloud network 140 except for the contextual trainer 120 and knowledgebase(s) 118. In this respect, the contextual trainer 120 and knowledgebase(s) 118 may be utilized for training, but are otherwise not accessible (for example, by an intruder) via the cloud network 140 or the wide-area network. In certain exemplary implementations, personal user data may be confined to the contextual trainer 120 and knowledgebase(s) 118. The system 100 may include one or more of: a web server 110, a call center server 112, a transaction server 114, a local network 116, an API server 122, and/or a Natural Language Processing device 124

(referred to herein as an NLP device). Embodiments of the disclosed technology utilize a contextual trainer 120 to interface with a trained encoder 128 (and in certain implementations, a decoder 130) and one or more knowledge bases 118, as will be explained in detail below with reference to FIG. 3 and FIG. 4. Certain technical benefits and improvements described herein may be enabled primarily by the contextual trainer 120 in conjunction with the trained encoder 128 and the one or more knowledge bases 118. While the system 100 depicted in FIG. 1 relates to an automated assistant, the teachings herein may enable fairness improvements, privacy improvements, and other technical benefits in numerous other applications.

In some embodiments, a customer may operate the user device 102. The user device 102 may communicate with one or more of the web server 110, call center server 112, and/or the transaction server 114 via an application installed on the user device 102. The user device 102 can include one or more of a mobile device, smartphone, general-purpose computer, tablet computer, laptop computer, telephone, PSTN landline, smart wearable device, voice command device, other mobile computing devices, or any other device capable of communicating with the WAN 106 and/or cloud network 140 and ultimately communicating with one or more components of the system 100. In some embodiments, user device 102 may include or incorporate electronic communication devices for hearing or vision impaired users. In certain embodiments, the user device 102 may be physically remote, but it may functionally act as a "local" device via its interaction with the on-premises components of system 100. For example, in one exemplary implementation of the disclosed technology, dialogue received from the user device 102 may be utilized to update the knowledge base(s) 118 so that up-to-date information may be utilized by the system 100.

Customers may include individuals such as, for example, subscribers, clients, prospective clients, or customers of an entity associated with an organization, such as individuals who have obtained, will obtain, or may obtain a product, service, or consultation from an entity associated with the system 100. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The WAN 106 and/or cloud network 140 may be of any suitable type, including individual connections via the internet such as cellular or WiFi networks. In some embodiments, the WAN 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The WAN 106 and/or cloud network 140 may include any type of computer networking arrangement used to exchange data. For example, the WAN 106 and/or cloud network 140 may be the Internet, a private data network, virtual private network using a public network, and/or other suitable connection(s) that enable(s) components in the system 100 environment to send and receive information between the components of the system 100. The WAN 106 and/or cloud network 140 may also include a public switched telephone network ("PSTN") and/or a wireless network.

In accordance with certain example implementations, a third-party server 126 may be in communication with the system 100 via the WAN 106 and/or cloud network 140. In certain implementations, the third-party server 126 can include a computer system associated with an entity (other than the entity associated with the system 100 and its customers) that performs one or more functions associated with the customers. For example, the third-party server 126 can include an automated teller machine (ATM) system that allows a customer to withdraw money from an account managed via an organization that controls the system 100. As another example, the third-party server 126 may include a computer system associated with a product repair service that submits a warranty claim for a product that a customer purchased from the organization that controls the system 100.

In certain embodiments, the user device 102 may also communicate, through the WAN 106 and/or cloud network 140, with the third-party server 126 that may provide the user device 102 with a plug-in or extension that may (e.g., automatically) determine that the user device 102 has reached a checkout webpage. In one example, the plug-in or extension may be or include ENO® by CAPITAL ONE®. In response, the plug-in or extension may request a virtual token from the system 100, which may generate the virtual token and transmit the virtual token to the user device 102 (e.g., to the plug-in or extension). The plug-in or extension may then automatically populate some or all of the fields on the checkout webpage with the information in the virtual token to facilitate the checkout process. In certain implementations, the virtual token may be or include an (e.g., new) virtual credit card number that corresponds to the user's pre-existing credit card account. The virtual token may also or instead include the user's name, billing address, expiration date for the virtual credit card number, CCV for the virtual credit card number, bank account number, routing number, etc.

The system 100 may be associated with and optionally controlled by an entity such as a business, corporation, individual, partnership, or any other entity that provides one or more of goods, services, and consultations to individuals such as customers. The system 100 may include one or more servers and computer systems for performing one or more functions associated with products and/or services that the organization provides. Such servers and computer systems may include, for example, the webserver 110, the call center server 112, and/or the transaction server 114, as well as any other computer systems necessary to accomplish tasks associated with the organization or the needs of customers (which may be customers of the entity associated with the organization). The web server 110 may include a computer system configured to generate and provide one or more websites accessible to customers, as well as any other individuals involved in the organization's normal operations. The web server 110, for example, may include a computer system configured to receive communications from the user device 102 via, for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the WAN 106 and/or cloud network 140) by one or more devices of the system 100 including, but not limited to the contextual trainer 120. In some embodiments, one or more processors 132 may be used to implement an automated natural language dialogue system that may interact with a customer via different types of communication channels such as a website, mobile application, instant messaging application, SMS message, email, or any other type of electronic communication. When receiving an incoming message from, for example, the user device 102 of a customer, the web server 110 may be configured to determine the type of communication channel the user device 102 used to generate the incoming message.

The call center server 112 may include a computer system configured to receive, process, and route telephone calls and other electronic communications between a customer operating a user device 102 and the various components of the system 100. The call center server 112 may have one or more processors 142 and one or more call center databases 144, which may be any suitable repository of call center data. Information stored in the call center server 112 may be accessed (e.g., retrieved, updated, and added to) via the local network 116 (and/or WAN 106 and/or cloud network 140) by one or more devices of the system 100. In some embodiments, the call center server processor 142 may be used to implement an interactive voice response (IVR) system that interacts with the customer over the phone.

The transaction server 114 may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with system 100 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or WAN 106 and/or cloud network 140) by one or more devices of the system 100.

In some embodiments, the transaction server 114 tracks and stores event data regarding interactions between a third-party, such as a third-party server 126, with the system 100, and on behalf of the individual customers. For example, the transaction server 114 may track third-party interactions such as purchase requests, refund requests, shipping status, shipping charges, warranty claims, account withdrawals and deposits, and any other type of interaction that the third-party server 126 may conduct with the system 100 on behalf of an individual such as a customer.

The local network 116 may include any type of computer networking arrangement used to exchange data in a localized area, such as WiFi, Bluetooth™ Ethernet, and other suitable network connections that enable local components of the system 100 (i.e., devices that run on-premises) to interact with one another and to connect to the WAN 106 and/or cloud network 140 for interacting with external components in the system 100 environment. In some embodiments, the local network 116 may include an interface for communicating with or linking to the WAN 106 and/or cloud network 140. In other embodiments, certain components of the system 100 may communicate via the WAN 106 and/or cloud network 140, without a separate local network 116.

In accordance with certain example implementations of the disclosed technology, the contextual trainer 120, which is described more fully below with reference to FIG. 3 and FIG. 4 below, may include one or more computer systems configured to compile data from a plurality of sources, such as the webserver 110, the call center server 112, the transaction server 114, and/or the one or more knowledge bases 118. According to some embodiments, the one or more knowledge bases 118 can be associated with an organization and/or a related entity that stores a variety of information relating to customers, transactions, and business operations. The one or more knowledge bases 118 may also serve as a back-up storage device and may contain data and information that is also stored on, for example, databases 134, 144, 154, 164, 174 (and 280, as will be discussed with reference to FIG. 2). The one or more knowledge bases 118 may be accessed by the contextual trainer 120 and may be used to store records of every interaction, communication, and/or transaction a particular customer has had with the organization 108 and/or its related entity in the past to enable the creation of an ever-evolving customer context that may enable the contextual trainer 120, in conjunction with the trained encoder 128, to provide inputs to NLP device 124 to generate and provide interactions with the customer using potentially biased and/or sensitive contextual customer data when the trained encoder 128 is utilized to interact with the customer via cloud-based services. The potentially sensitive contextual customer data may be utilized to improve online automated dialogue responses while eliminating the ability of an intruder to access such data In certain implementations, sensitive contextual data may be kept in a local knowledge base (and/or a user's device) without being shared to a cloud platform, even if the neural model is trained in the cloud network 140.

In certain example implementations, the API server 122 may include a computer system configured to execute one or more application program interfaces (APIs) that provide various functionalities related to the operations of the system 100. In some embodiments, the API server 122 may include API adapters that enable the API server 122 to interface with and utilize enterprise APIs maintained by an organization and/or an associated entity that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to the management of customer profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or WAN 106 and/or cloud network 140) by one or more devices of system 100. In some embodiments, the API processor 162 may be used to implement one or more APIs that can access, modify, and retrieve customer account information. In certain embodiments, real-time APIs consistent with certain disclosed embodiments may use Representational State Transfer (REST) style architecture, and in this scenario, the real-time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured synchronously and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server to implement the API return messages in JSON format in response to the request calls from the client.

In accordance with certain example implementations of the disclosed technology, the NLP device 124 may include a computer system configured to receive and process incoming messages and determine the meaning of the incoming message. For example, the NLP device 124 may be configured to receive and execute commands that instruct the NLP device 124 to determine the meaning of the incoming dialogue message. In certain example implementations, the output of the contextual trainer 120 may issue dialog modifying commands to the NLP device 124, for example, that instruct the NLP device 124 to formulate/revise a response based on rules and/or determined information related to the customer interaction, specifics related to an order, etc. Thus, in certain example implementations, the contextual trainer 120, in conjunction with the trained encoder 128, the (optional) decoder 130, and the one or more knowledge bases 118 may program the NLP device 124.

In certain implementations, the NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. The NLP device 124 may be configured to output an event representing the meaning of the incoming message to an event queue for processing by another device of the system 100. In some embodiments, the NLP device 124 may be configured to generate a natural language phrase in response to receiving a command. Accordingly, in some embodiments, the NLP device 124 may be configured to output an event that contains data representing natural language.

The NLP device 124 may include one or more processors 172 and one or more NLP databases 174, which may be any suitable repository of NLP data. Information stored in the NLP device 124 may be accessed (e.g., retrieved, updated, and added to) via the local network 116 (and/or WAN 106 and/or cloud network 140) by one or more devices of system 100. In some embodiments, the NLP processor 172 may be used to implement an NLP system that can determine the meaning behind a string of text and convert it to a form that can be understood by other devices.

Although the preceding description describes various functions of the web server 110, the call center server 112, the transaction server 114, the contextual trainer 120, the one or more knowledge bases 118, the trained encoder 128, the decoder 130, the API server 122, and the NLP device 124, in some embodiments, some or all of these functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general-purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer-readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The one or more knowledge bases 118 may include stored data relating to a customer profile and customer accounts, for example, customer identification, name, age, sex, birthday, address, account status, preferences, preferred language, greeting name, preferred communication channel, account numbers, order history, delivery history, authorized users associated with one or more accounts, account balances, account payment history, and other such typical account information. In one aspect, the knowledge base may utilize Attention to encode knowledge in a model. For example, calendar knowledge may be utilized to encode time information into a Seq2seq model. The one or more knowledge bases 118 may further include stored data relating to previous interactions between the organization (or its related entity) and a customer. For example, the one or more knowledge bases 118 may store customer interaction data that includes records of previous customer service interactions with a customer via a website, SMS, a chat program, a mobile application, an IVR system, or notations taken after speaking with a customer service agent. The one or more knowledge bases 118 may also include information about business transactions between the organization (or its related entity) and a customer that may be obtained from, for example, the transaction server 114.

The one or more knowledge bases 118 may also include customer feedback data such as an indication of whether an automated interaction with a customer was successful, online surveys filled out by a customer, surveys answered by a customer following previous interactions to the company, digital feedback provided through websites or mobile applications associated with the organization or its related entity (e.g., selecting a smiley face or thumbs up to indicate approval), reviews written by a customer, complaint forms filled out by a customer, information obtained from verbal interactions with the customer (e.g., information derived from a transcript of a customer service call with a customer that is generated using, for example, voice recognition techniques) or any other types of communications from a customer to the organization or its related entity.

Figure 2:
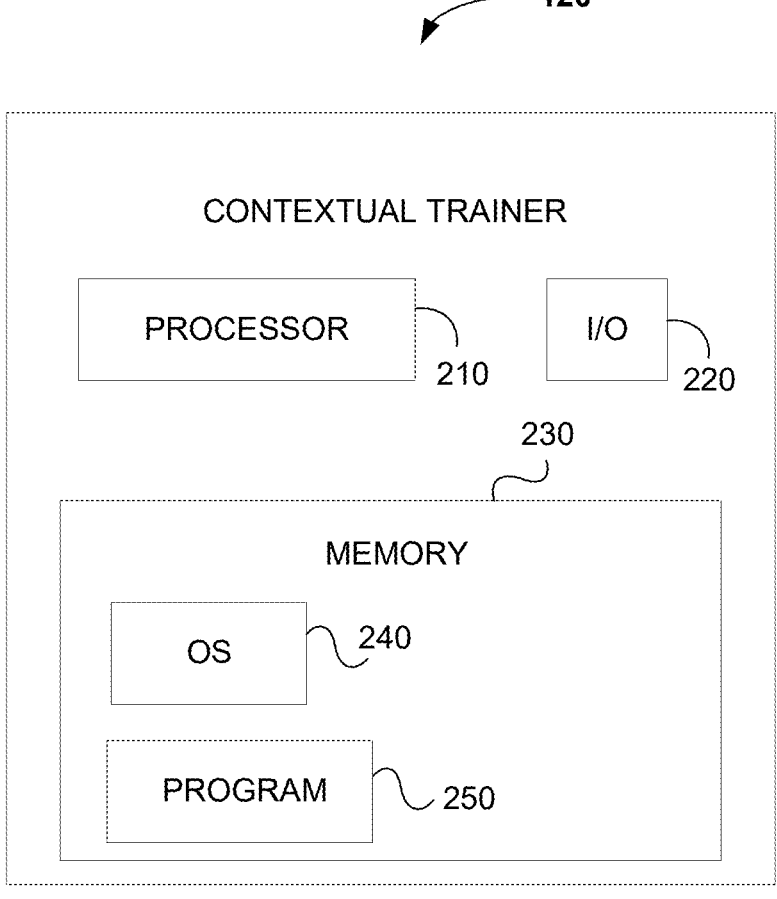
FIG. 2 is a block diagram of an example contextual trainer, as also depicted in FIG. 1, according to an example implementation of the disclosed technology.

FIG. 2 is a block diagram (with additional details) of the example contextual trainer 120, as also depicted in FIG. 1. As shown, the contextual trainer 120 may include a processor 210, an input/output ("I/O") device 220, a memory 230 containing an operating system ("OS") 240, and a program 250. In certain example implementations, the contextual trainer 120 may be a single server or may be configured as a distributed computer system including multiple servers or computers that interoperate to perform one or more of the processes and functionalities associated with the disclosed embodiments. In some embodiments, the contextual trainer 120 may further include a peripheral interface, a transceiver, a mobile network interface in communication with the processor 210, a bus configured to facilitate communication between the various components of the contextual trainer 120, and a power source configured to power one or more components of the contextual trainer 120.

A peripheral interface, for example, may include the hardware, firmware and/or software that enable(s) communication with various peripheral devices, such as media drives (e.g., magnetic disk, solid-state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor, or the like or combinations thereof capable of executing stored instructions and operating upon stored data. The memory 230 may include, in some implementations, one or more suitable types of memory (e.g. such as volatile or non-volatile memory, random access memory (RAM), read-only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple-core processor that executes parallel processes simultaneously. For example, the processor 210 may be a single-core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the contextual trainer 120 may include one or more storage devices configured to store information used by the processor 210 (or other components) to perform certain functions related to the disclosed embodiments. In one example, the contextual trainer 120 may include the memory 230 that includes instructions to enable the processor 210 to execute one or more applications, such as server applications, network communication processes, and any other type of application or software known to be available on computer systems. Alternatively, the instructions, application programs, etc. may be stored in external storage or available from a memory over a network. The one or more storage devices may be a volatile or non-volatile, magnetic, semiconductor, tape, optical, removable, non-removable, or another type of storage device or tangible computer-readable medium.

In one embodiment, the contextual trainer 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the contextual trainer 120 may include the memory 230 that may include one or more programs 250 to perform one or more functions of the disclosed embodiments. For example, in some embodiments, the contextual trainer 120 may additionally provide dialogue and/or other interactions via a program 250.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a customer information database 280 for storing related data to enable the contextual trainer 120 to perform one or more of the processes and functionalities associated with the disclosed embodiments.

The contextual trainer 120 may also be communicatively connected to one or more memory devices (e.g., databases) locally or remotely through a network. Remote memory devices may be configured to store information and may be accessed and/or managed by the contextual trainer 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The contextual trainer 120 may also include one or more I/O devices 220 that may comprise one or more interfaces for receiving signals or input from devices and providing signals or output to one or more devices that allow data to be received and/or transmitted by the contextual trainer 120. For example, the contextual trainer 120 may include interface components, which may provide interfaces to one or more input devices, such as one or more keyboards, mouse devices, touch screens, trackpads, trackballs, scroll wheels, digital cameras, microphones, sensors, and the like, that enable the contextual trainer 120 to receive data from one or more users (such as, for example, via the user device 102).

For example embodiments of the disclosed technology, the contextual trainer 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the contextual trainer 120 has been described as one form for implementing the techniques described herein, other, functionally equivalent techniques may be employed. For example, some or all of the functionality implemented via executable instructions may also be implemented using firmware and/or hardware devices such as application-specific integrated circuits (ASICs), programmable logic arrays, state machines, etc. Furthermore, other implementations of the contextual trainer 120 may include a greater or lesser number of components than those illustrated.

Certain interactions/interoperability between the trained encoder 128, the contextual trainer 120, and the one or more knowledge bases 118, as discussed above with reference to FIG. 1 and FIG. 2 will be discussed with reference to FIG. 3.

Figure 3:
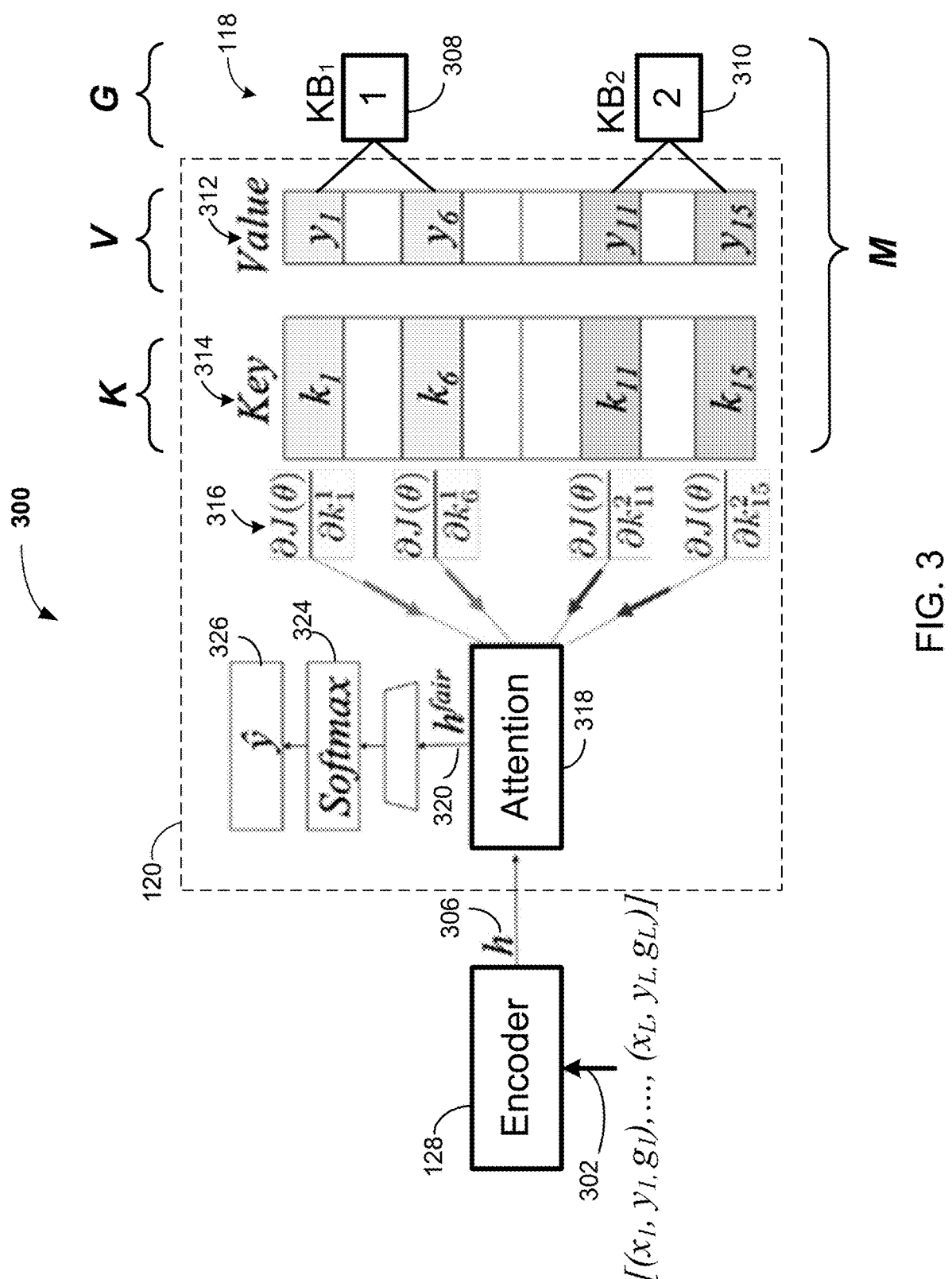
FIG. 3 is a block diagram depicting the extension of a trained neural network to external memory, according to certain exemplary embodiments of the disclosed technology.

FIG. 3 is a block diagram 300 depicting the extension of a trained neural network (encoder 128) to external memory according to certain exemplary embodiments of the disclosed technology. External memory is an array of learnable features that extends the capacity of the neural network model during training via sparse updates operations. In accordance with certain exemplary implementations of the disclosed technology, the external memory may be embodied as one or more knowledge bases 118, that are "external" to the encoder 128. In certain implementations, a neural network model may be trained based on the computation of gradients 316 of an error function with respect to any given parameter of the neural network. The extension/interaction of the trained neural network with external memory enables the use of contextual (and/or possibly sensitive) customer data (such as gender information stored in one or more knowledge bases 118) to be utilized to take an output activation h 306 of a trained neural network (encoder 128) that is generated in response to textual data input 302 and enhance, revise, or otherwise improve the activation h 306 to produce an enhanced output ŷ 326 without uploading to the cloud, the (possibly sensitive) data stored in the knowledge bases 118 and without explicitly including such data in the enhanced output ŷ 326. In other words, the data stored in external memory (i.e., the one or more knowledge bases 118) can be utilized to modify the output h 306 of a trained neural network (encoder 128) for an online automated enhanced output ŷ 326 response without such data being included in the response, for example, by utilizing the computed gradients 316.

In the example block diagram shown in FIG. 3, the one or more knowledge bases 118, together with the Keys 314 and Values 312 may be denoted as memory M. In certain example implementations, the Keys 314 and Values 312 may be utilized by the contextual trainer 120 to encode the knowledge base data 308, 310 into the respective gradients 316. In certain implementations, the memory M may consist of arrays K, V, and G—where K stores addressable keys 314 (latent representations of the input), V stores values 312 (class labels), and (in this specific example) G stores a gender designation associated with each word (e.g., the actor is male, the actress is female, and scientist is no-gender). The resulting memory module may be expressed in the form: M=(K, V, G).

In accordance with an exemplary implementation of the disclosed technology, a neural encoder 128 with trainable parameters θ may receive an observation such as input textual data 302 $[(x_1, y_1, g_1), \ldots, (x_L, y_L, g_L)]$, and in response, may generate the activations h 306.

In certain example implementations, the trained encoder 128 may generate the activation h 306 in response to input textual data 302, such as an inquiry by a customer. The contextual trainer 120 may be trained by encoding content of the local knowledge bases 118 into key 314 and value 312 pairs, which may be used to generate gradients 316 to make predictions based on contextual and/or private customer data stored in the local knowledge bases 118 and to produce an enhanced output ŷ 326 for responding to a customer query, for example, while not including such contextual and/or private customer data in the enhanced output ŷ 326. The gradients 316 and the activation h 306 may be input into an Attention 318 mechanism, which may be utilized to decide which parts of the source sentence (i.e., the user utterance in the form of input textual data 302) to pay attention to, and may produce an output $h_{fair}$ 320, which may be acted on by a Softmax 324 function (which is a function that induces a distribution by converting numbers into probabilities), to produce the enhanced output ŷ 326 without requiring any of the data in the knowledge bases 118 to be explicitly included in the enhanced output ŷ 326 and to further prevent access to such data by an intruder. The Softmax function (also known as softargmax or normalized exponential function) takes a vector z of K real numbers as input and normalizes it into a probability distribution consisting of K probabilities proportional to the exponentials of the input numbers. Softmax is often used in neural networks, to map the non-normalized output of a network to a probability distribution over predicted output classes. Certain vectors have components that do not sum to 1, making them incompatible with interpreting probabilities. However, after applying a Softmax 324 function to a vector, each component can be transformed within a predefined interval, allowing the (transformed) vector components to be interpreted as probabilities.

In certain implementations, a normalized version of the activation h 306 (i.e., ‖h‖=1) may be stored in the memory M to increase the capacity of the encoding. For example, let $i_{max}$ be the index of the most similar key to the dot product of h and K:

$$i_{max} = \text{argmax}_i \{h \cdot K[i]\},$$

then writing the triplet (x, y, g) to M consist of:

$$K[i_{max}] = h + K[i_{max}]$$

$$V[i_{max}] = y$$

$$G[i_{max}] = g$$

however, the number of word embeddings stored in the external memory may not provide an equal representation across different features (e.g., gender types) because these word embeddings may be biased in natural language. For example, it has been shown in that the word man is associated closer with the word programmer than it is to the word woman. Traditional memory networks lack a way to eliminate such natural language biases or to control the semantics of word embeddings and their associated features (such as gender or age). Implementations of the disclosed technology provide a technical solution to such shortcomings.

In accordance with certain exemplary implementations of the disclosed technology, the concept of a Fair Region in memory M is utilized. The Fair Region of a memory network may include a subset of the memory keys 314 which are responsible for computing error signals and generating gradients 316 that will flow through the entire architecture with backpropagation.

In one example implementation, it may be desired to induce a uniform gender distribution within this region. The result is a training process for which gender-related embeddings may equally contribute in number to the update and/or re-training of the architecture. This embedding level constraint prevents the unconstrained learning of correlations between an activation vector h and similar memory entries in M directly in the latent space considering explicit gender indicators.

The Fair Region may consist of the most similar keys to h given a uniform distribution over genders (e.g., 1: male, and 2: female). In one example, the input 302 may consist of a sequence of tokens annotated with gender information, e.g., (The, 0), (president, 0), (gave, 0), (her, 2), (speech, 0).

In accordance with certain exemplary implementations, the same number of key-value pairs from male and female groups may be used to generate "fair gradients" as both groups may be utilized to equally impact the model. The generation of $h_{fair}$ 320 and the concept of the Fair Region will be discussed further below with reference to FIG. 4, with additional experimental results described in: "On the Unintended Social Bias of Training Language Generation Models with Data from Local Media," Omar U. Florez, arXiv:1911.00461, Nov. 1, 2019; which is incorporated herein by reference as if presented in full. The Attention 318 mechanism is discussed in "Neural Machine Translation by Jointly Learning to Align and Translate," Dzmitry Bahdanau, Kyunghyun Cho, and Yoshua, arXiv:1409.0473, 2015; which is incorporated herein by reference as if presented in full.

In accordance with certain exemplary implementations, the gradients 316 may be grouped according to the corresponding knowledge base (for example, knowledge bases 308, 310) enabling the use of more than one knowledge base during training without interfering in the access to memory keys. Generally, training or re-training an encoder can be an expensive and time-consuming process, particularly in sophisticated sequence to sequence networks. In certain implementations of the disclosed technology, the contextual trainer 120 may provide the gradients 316 and associated predictions without retraining the trained encoder 128.

In one example implementation, the trained encoder 128 may utilize a Seq2seq algorithm to turn one sequence into another sequence via a recurrent neural network. In another example implementation, the trained encoder 128 may be one or more gated recurrent units. In another example implementation, the trained encoder 128 may comprise a transformer. In another example implementation, the trained encoder 128 may utilize a Seq2seq algorithm in the form of a long-short term memory (LSTM) neural network, for example, that is trained offline to receive textual data and memorize sequential patterns with large datasets. Certain details of an LSTM neural network is described in "Understanding LSTM Networks," by Christopher Olah, 2015, which is incorporated herein by reference as if presented in full.

The example discussed with reference to FIG. 3 utilizes two states stored in one or more of the knowledge bases 118 to represent gender. For example, a first knowledge base $KB_1$ 308 utilizes a "1" to designate a male, and a second knowledge base $KB_3$ 310 utilizes a "2" to designate a female. However, it should be understood that more than two states may be represented in the knowledge bases 118. For example, age, zip code, etc., attributes may be encoded. In accordance with certain exemplary embodiments, the local knowledge bases 118 may be used to incorporate these attributes when training (for example, in the cloud) the entire architecture (which also includes the encoder) while also controlling the information that they provide towards training a model. The result is a model in which both encoder and external memory has changed to accommodate the information present in a local knowledge base.

Figure 4:
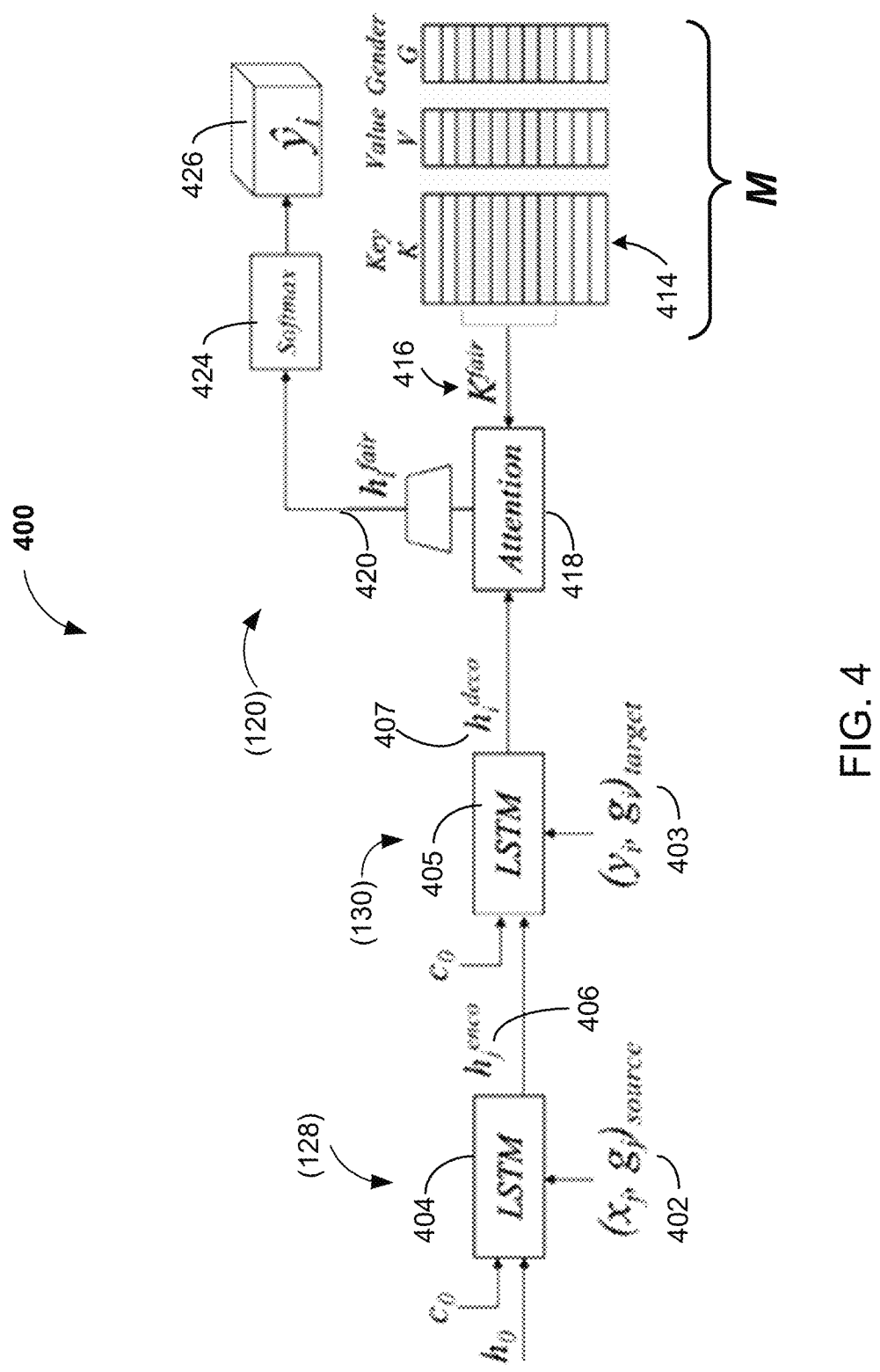
FIG. 4 illustrates an example language model generation system, in accordance with an example implementation of the disclosed technology.

FIG. 4 illustrates an example language model generation system 400, in accordance with an example implementation of the disclosed technology and will now be discussed to further illustrate the use of the Fair Region and to provide additional details for how possibly sensitive information may be utilized to refine an output while avoiding biasing, and without exposing such sensitive information.

In accordance with certain exemplary implementations of the disclosed technology, a Fair Region may be defined as follows: let h be a latent representation of the input and let M be an external memory. The male-neighborhood of h may be represented by the indices of the n-nearest keys to h in decreasing order that share the same gender type male and may be expressed as:

$$\{i_1^m, \ldots, i_{1k}^m\} = KNN(h, n, \text{male}).$$

This process may be applied to each gender type to provide estimates for the indices $i^m$, $i^f$, and $i^{ng}$, which corresponds to the male, female, and non-gender neighborhoods. The Fair Region of M given h consists of:

$$K[i^m, i^f, i^{ng}].$$

The Fair Region of a memory network consists of a subset of the memory keys which are responsible for computing error signals and generating gradients (such as gradients 316 shown in FIG. 3) that may flow through the entire architecture with backpropagation. The result (in this gender example) is a process in which gender-related embeddings may equally contribute in number for updating the system 400. In general, this embedding level constraint prevents the unconstrained learning of correlations between a latent vector h and similar memory entries in M directly in the latent space considering explicit indicators.

The illustrative system 400 of FIG. 4 may include all or part of the components shown and discussed above with reference to FIG. 3. FIG. 4 depicts an encoder 404 (such as encoder 128 shown in FIG. 1) for receiving input dialogue 402 and further depicts a decoder 405 (such as decoder 130 shown in FIG. 1) for capturing a response 403 that can be further refined with the contextual trainer 120. FIG. 4 shows the $i^{th}$ decoding step of the word $\hat{y}_i$ 426 given the sparse update within a Fair Region centered at $h^{deco}$ 407. Certain implementations of the disclosed technology may leverage addressable keys 414 of a memory M to augment a neural network (encoder 404 and decoder 405) by utilizing Fair Regions to guide the automatic generation of text. In this example implementation, the inputs may be two sentences x and y from the source 402 and target 403 domain, respectively. An LSTM encoder 404 may output the context-sensitive hidden representation $h^{enco}$ 406 based on the history of sentences and an LSTM decoder 405 may receive both $h^{enco}$ 406 and y and may predict the sequence of words $\hat{y}$ 426. At every timestep of decoding, and in certain implementation, the decoder 405 may predict the $i^{th}$ token of the output $\hat{y}$ 426 by computing its corresponding hidden state $$h_i^{deco}$$

407 by applying the recurrence:

$$h_i^{deco} = LSTM(y_{i-1}, h_{i-1}^{deco}).$$

Instead of using the decoder output $$h_i^{deco}$$

407 to directly predict the next word as a prediction over the vocabulary O, this vector is combined with a query to the memory module to compute the embedding vector $$h_i^{fair}$$

420 by computing an Attention score 418 (Bahdanau et al.) with each key $$K_{\Box}^{fair}$$

416 of a Fair Region. In certain implementations, the Attention 418 scores become the unnormalized probabilities including their associated values for predicting the $i^{th}$ token of the response output $\hat{y}$ 426. In certain implementations, an argmax function may be used on the most likely entry in the output vocabulary O to obtain the $i^{th}$ predicted token of the response output $\hat{y}$ 426 using the following process:

$$K^{fair} = FairRegion(h^{deco}, K, n),$$

$$a_i = Softmax\left(h_i^{deco} \cdot K^{fair}\right),$$

$$h_i^{fair} = Wtanh\left(a_i \cdot K^{fair}\right),$$

$$\hat{y} = Softmax\left(h_i^{fair}\right),$$

$$\hat{y}_i = O[argmax_j(\hat{y}[j]).$$

The objective function is to minimize the cross-entropy of actual and generated content:

$$J(\theta) = -\sum_{j=1}^{N}\sum_{i=1}^{m} y_i^j \log\ p(\hat{y}_i^j),$$

where N is the number of training conversations used to train the model, m indicates the number of words in the generated output, and $$\hat{y}_i^j$$

is the one-hot representation of the $i^{th}$ word in the target sequence.

Figure 5:
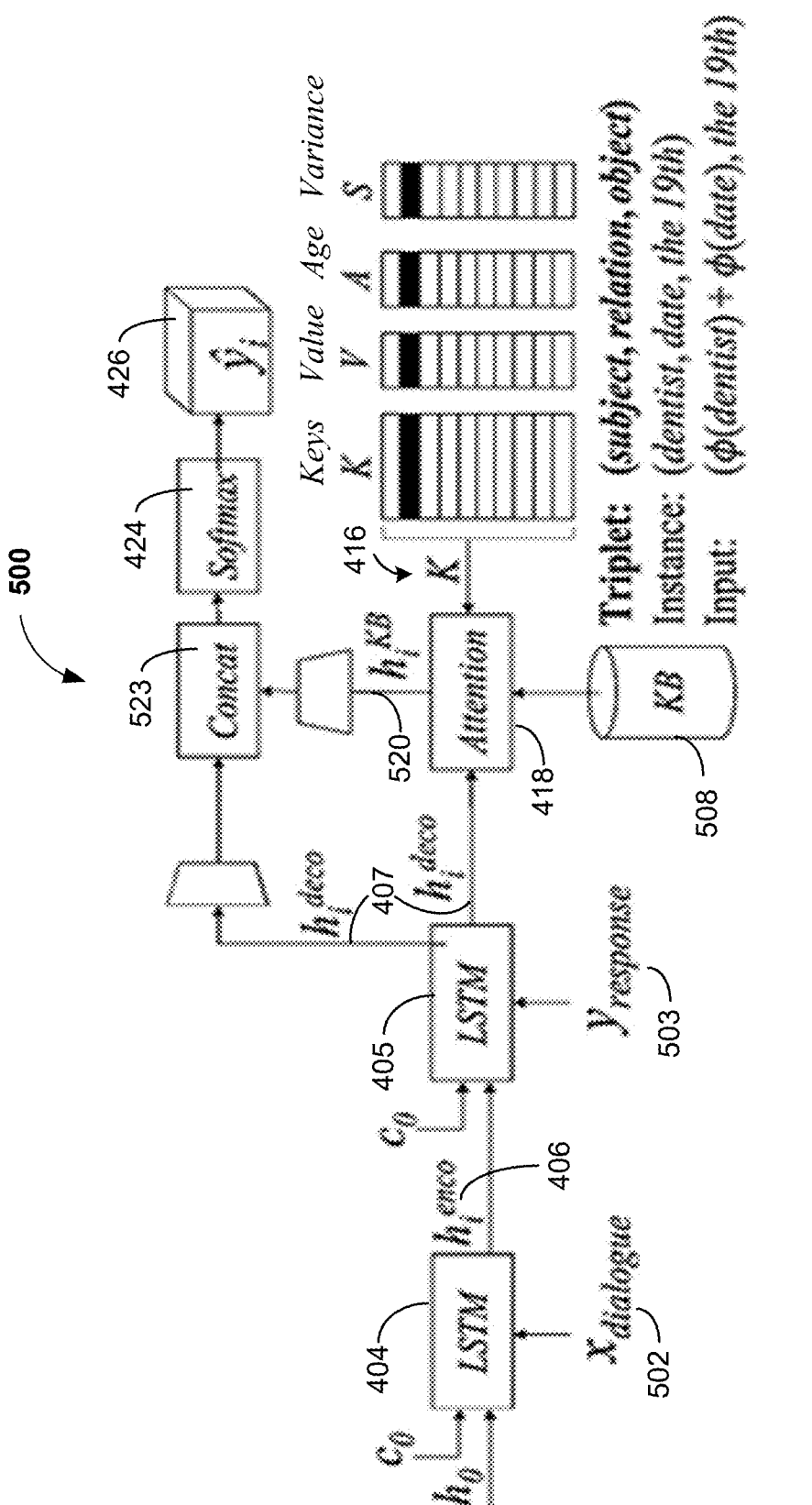
FIG. 5 depicts a neural dialogue system that may utilize a decoupled memory mechanism, according to an example implementation of the disclosed technology.

FIG. 5 depicts a neural dialogue system 500 that may utilize an external memory. Certain implementation of the neural dialogue system 500 may include all, part, and/or similar components and functions as discussed above with reference to FIG. 3 and/or FIG. 4. In certain implementations, the prediction of the current word y; 426 may be a combination of both the decoder 405 output and the Attention 418 map in the external memory storing a knowledge base 508 as sets of triplets.

In this example implementation, the neural network trained encoder 404 may receive input dialogue history $x_{dialogue}$ 502, and the decoder 405 may capture the neural network's response $y_{response}$ 503 so that it can be further refined. A predicted response $\tilde{y}$ 426 may be produced given an Attention 418 map over keys K 416. In certain implementations, the Attention 418 mechanism may be utilized to compute a dot product operation with each key of the memory, which can provide unnormalized probabilities that represent the importance of each value to be part of the output token $\tilde{y}$ 426 at each decoding step. In accordance with certain example implementations, the output $h^{deco}$ 407 of the decoder 405 may be concatenated 523 with the output $$h_i^{KB}$$

520 of the Attention 418 map over the memory entries and the resulting vector may be projected to obtain a vector with a size equal to the number of words in the output vocabulary. In certain implementations, the Softmax 424 function may be utilized to induce a probability distribution over these words. Choosing the most likely entry in the probability distribution may be utilized to provide the predicted token $\tilde{y}$ 426.

In accordance with certain exemplary embodiments of the disclosed technology, personal and/or private data may be stored in the local knowledge base(s) 508 and used to locally encode key K and value V memory network components, eliminating need to send or expose such personal data, for example, to the cloud. To encode the data in the knowledge base(s) 508, addressable memory entries of the memory network allow generalization with fewer latent representations of the knowledge base, even if they were present once during training.

As depicted in FIG. 5, and according to certain exemplary implementations, a knowledge base 508 of a given dialogue may be stored by decomposing it from its tabular format to a collection of triplets that expresses the following relationship: (subject, relation, object). For example, an entry in a knowledge base may represent information about a dentist appointment in the following format: (event=dentist, date=the 19th, time=5 pm, party-Mike). This information may then be normalized into 12 different triplets: [(dentist, date, the 19th), (dentist, time, 5 pm), (dentist, party, Mike), (Mike, time, 5 pm), (dentist, date, the 19th), (dentist, time, 5 pm), (dentist, party, Mike), (the 19th, event, dentist), (the 19th, party, Mike), (the 19th, time, 5 pm), (5 pm, event, dentist), (5 pm, date, the 19th), (5 pm, party, Mike), (Mike, event, dentist), (Mike, date, the 19th), (Mike, time, 5 pm)]. Each triplet may feed the external memory with the following key-value format: (Φemb (subject)+Φemb (relation), object), where Φemb is a trainable embedding function that maps tokens to a fixed-dimensional vector. The function Φ( ) can be considered a word embedding function that turns a word into a vector. In certain exemplary implementations, the word embedding is computed for the subject and the relation parts of a triplet and they are added to generate a key. A value may be considered as the object component of the triplet.

In certain implementations, a dialogue history may be considered a sequence between customer utterances ('What is my account balance?') and system responses ('The balance of your account is X') during a dialogue. In order to properly address a customer question or utterance, it can be beneficial to access external information stored in a knowledge base 508. In certain example implementations, the decoder 405 may be utilized to interact with the external key-value memory.

For the purpose of modeling dialogues, this means that a dialogue history can be previously learned offline as a generic model that is shared across different customers. The more dynamic and contextual component, responsible for encoding user knowledge base(s) 508, can be personalized to each customer keeping his/her data local during training.

In accordance with certain exemplary embodiments, the combination of both the decoder 405 output 407 and Attention 418 map in the external memory and storing a knowledge base 508 as sets of triplets provides an end-to-end system that may automatically incorporate knowledge bases. The disclosed technology may further enable a more flexible re-training of a neural model utilizing contextual information while keeping the contextual information stored in a knowledge base. Additionally, the disclosed technology may provide the further benefit of enabling generic neural encoders to be enhanced with specific customer information without creating biasing or privacy issues.

Figure 6:
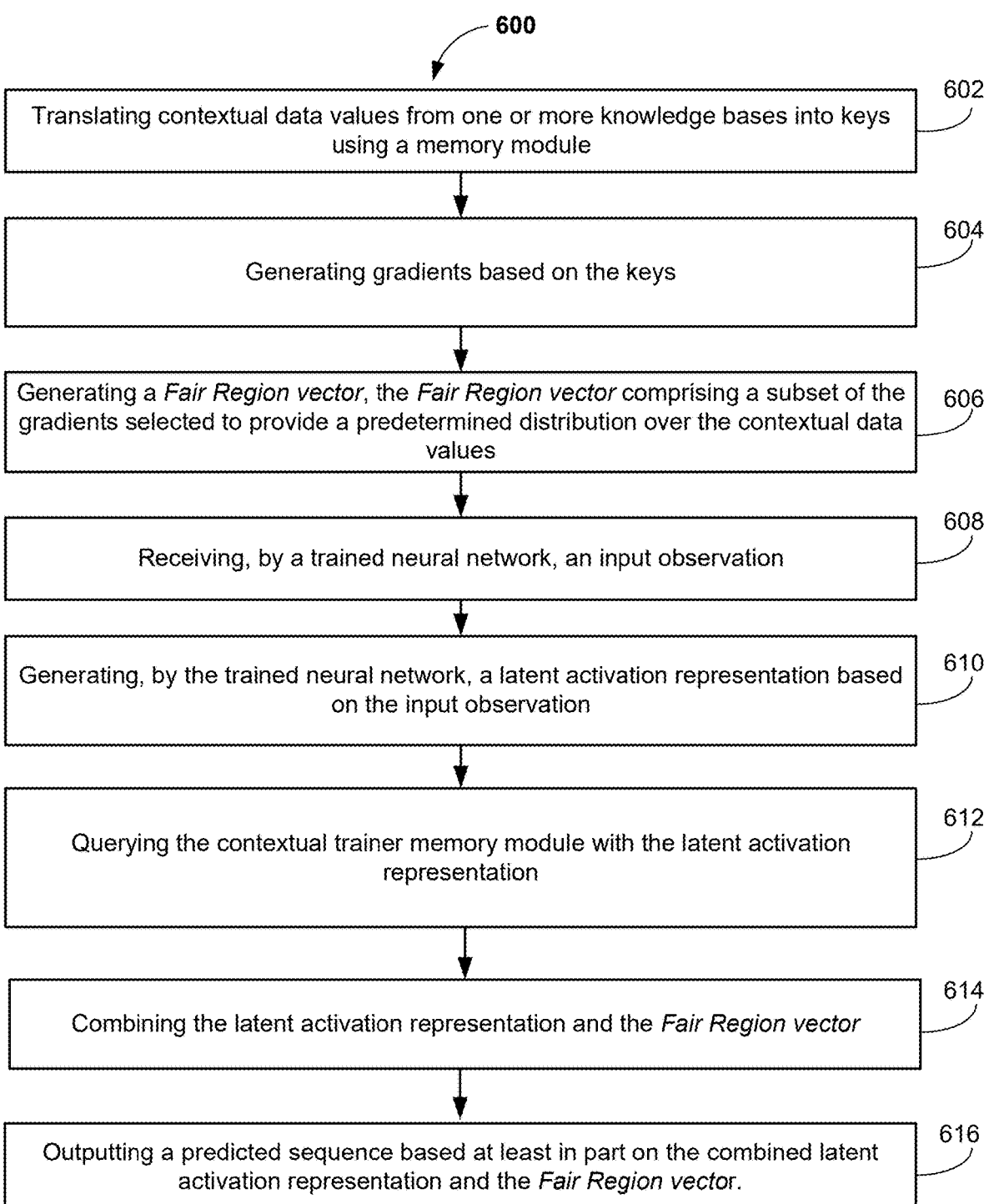
FIG. 6 is a flow chart of a method for adapting a trained neural network response using contextual data, in accordance with an example implementation of the disclosed technology.

FIG. 6 is a flow chart of a method 600 for generating a neural network response using customer contextual data while controlling bias without exposing private customer data. In block 602, the method 600 includes translating contextual data values from one or more knowledge bases into keys using a memory module. In block 604, the method 600 includes generating gradients based on the keys. In block 606, the method 600 includes generating a vector that characterizes elements of a Fair Region, where the vector is utilized to generate gradients representative of data in the knowledge base. In block 608, the method 600 includes receiving, by a trained neural network, an input observation x. In block 610, the method 600 includes generating, by the trained neural network, a latent activation representation h based on the input observation x. In block 612, the method 600 includes querying the contextual trainer memory module with the latent activation representation h. In block 614, the method 600 includes combining the latent activation representation and the Fair Region vector. In block 616, the method 600 includes outputting a predicted sequence ý based at least in part on the combined latent activation representation and the Fair Region vector.

In certain implementations, the trained neural network may include an encoder in communication with a decoder, wherein the encoder is configured to receive the input observation x and provide an encoded latent activation output $h^{enco}$. In certain implementations, the decoder may be configured to receive the encoded latent activation output $h^{enco}$ and a target response input y to produce a decoded latent activation representation $h^{deco}$ for input to the contextual trainer memory module.

In certain implementations, the input observation x may include dialogue received from a customer. In certain implementation, the target response input y may include an intermediate response generated by a Natural Language Processing (NLP) device. In certain implementations, the contextual data values from the one or more knowledge bases may be vectorized and used to query the content of the external memory. In accordance with certain exemplary implementations of the disclosed technology, the most similar keys in the external memory may become activated and may become part of the training process. In certain implementations, vector representations of these keys can change during training based on gradient updates, which can be influenced by new contextual data received from the one or more knowledge bases.

In certain example implementation, the predicted sequence y may be a word-by-word concatenation based on contextual data received from the one or more knowledge bases without exposing the contextual data.

In certain implementations, the input observation x can include a query received from the customer and the predicted sequence y may be output for review by the customer. According to certain example implementations, the contextual trainer memory module may occupy memory external to the trained neural network. In certain implementations, the gradients may be grouped according to one or more knowledge bases.

According to certain example implementations of the disclosed technology, the term "dialogue" as used herein may refer to information and/or communication received from a customer and/or provided to a customer as part of the interaction(s) between the customer and the intelligent automated virtual assistant system 100. In some implementations, such interactions may utilize certain communication channels (such as voice, e-mail, messaging, etc.) to exchange textual, audible, and/or video information. Certain example implementations may utilize customer history records and/or records of communications with human customer service representatives to provide additional context for the interaction between the customer and the intelligent agent system. According to certain example implementations of the disclosed technology, the dialogue may be in the form of interactive (i.e., back-and-forth, two-way, conversation-like) communications between the customer and the intelligent automated virtual assistant system 100. In some implementations, the dialogue may be in the form of non-interactive (i.e., single-sided, one-way, story-like) communications. In certain example implementations, records of interactive and/or non-interactive communications conducted with the customer may be utilized. In certain implementations, such communication information may be obtained, for example, through a chat window, e-mail, phone call, etc., and/or recorded through textual, audible, and/or video information channels.

In certain example implementations, the intelligent automated virtual assistant system 100 may execute instructions to conduct general dialogue with a customer to identify the first trigger of a predetermined plurality of triggers. Upon identifying the first trigger, the system 100 may generate one or more responses. Optionally, in some embodiments, the system may generate general information-eliciting utterances. Regardless of whether additional information is required, the system 100 may generate one or more candidate responses. Upon doing so, the system may identify relevant missing information and generate specific information-eliciting responses.

In accordance with certain example implementations, the systems and methods disclosed herein include virtual assistants that utilize machine learning and/or Artificial Intelligence (A.I.) systems to operate and interact with a customer without the need for a human customer service representative. It is frequently impossible for humans to perform the calculations performed by A.I. systems. For example, and as disclosed herein, the processing that the A.I. systems perform is often not pre-programmed and may vary depending on dynamic factors, such as the utterance input received, a time at which the input data set was processed, other input data previously processed, etc. For A.I. systems (such as those disclosed herein) that employ repeated or continuous learning, it may even be impossible to identify the particular algorithm(s) used to process a given input data set. These complexities indicate that A.I. systems are more than just a set of algorithms, but rather frameworks that are carefully designed in terms of input variables, hyperparameters, optimization variables, training data sets, validation data sets, etc. Certain algorithms may support and define a high-level A.I. framework but may or may not be the same algorithms that are used to process input data. In accordance with certain implementations of the disclosed technology, the machine-learning/A.I. framework disclosed herein performs a superior job (compared with a human) of identifying specific data-processing algorithms (e.g., in terms of machine-learning parameters). Thus, the A.I. system discussed herein may not utilize predefined computer algorithms and may extend well beyond mental processes and abstract ideas.

The technology disclosed herein typically involves a high-level design effort to construct a computational system that can appropriately process unpredictable data. Mathematical algorithms may be used as building blocks for a framework, however certain implementations of the system may autonomously learn its own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer-readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include but are not limited to portable computers, tablet PCs, internet tablets, PDAs, ultra-mobile PCs (UMPCs), wearable devices, and smartphones. Additionally, implementations of the disclosed technology can be utilized with the internet of things (IOT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods, and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

In the context of a customer service interaction, a customer may contact a business entity to request information and/or action. Examples of such requests can include inquiries regarding ordered goods (such as a tracking number, a request for a refund on returned goods, etc.), questions or requests regarding services (such as an account balance inquiry, a transfer request, a request to schedule, confirm, or cancel an appointment, etc.,) and/or other customer service-related communications. In response to the request, the business entity may utilize an intelligent automated virtual assistant and machine learning to interpret dialogue/chat and provide automated contextual information to the customer.

The business entity may store certain records about the customer in a knowledge base and may utilize such records to enhance the speed, efficiency, and/or accuracy of the automated customer service interaction. For example, the knowledge base may store order histories, account numbers, mailing addresses, previous chat records, etc., that the business entity may utilize to conduct routine business with the customer. The business entity may also have possession of certain sensitive data, such as gender, age, current location, credit card numbers, social security numbers, previous addresses, etc. This potentially sensitive data may be used to enhance the accuracy of the machine learning model and improve a subsequent automated response. In some instances, the potentially sensitive information could be used to solve or eliminate problems, provide a tailored response, upsell a product or service, and/or enhance the effectiveness or efficiency of the customer service interaction. However, such information could also potentially create privacy issues and/or lead to fraudulent activity if leaked or exposed. Furthermore, if not utilized judicially, such information could negatively impact the model and/or produce a response that is biased.

In a specific use case where a customer's age is saved in the knowledge base and could be useful in generating and providing useful interaction dialogue (such as providing product recommendations based on age) but may also result in a potentially offensive age-biased recommendation to a customer. The systems and methods disclosed herein may utilize machine learning with a model that may be updated using external memory and key-value pairs from a uniform distribution of age groups (via fair gradients) so that information from the distribution of age groups may be utilized to equally impact the model, and may result in an automated response that is not age-biased.

We claim:
1. A system for adapting a response of a trained neural network using customer contextual data while controlling bias, the system comprising:
  one or more processors;
  a trained neural network comprising a long-short term memory (LSTM) encoder and a LSTM decoder;
  one or more knowledge bases external to the trained neural network and configured to store sensitive customer data;
  a contextual trainer in communication with the trained neural network and the one or more knowledge bases; and
  memory in communication with the one or more processors and storing instructions that, when executed by the one or more processors, cause the one or more processors to:
    translate, by the contextual trainer, the sensitive customer data from the one or more knowledge bases into keys;
    receive, by the trained neural network, an input observation x comprising a customer query;
    continuously listen for, by the trained neural network, one or more commands issued by the contextual trainer, wherein the one or more commands are configured to program the trained neural network to formulate and revise responses to the customer query based on one or more rules;

generate, by the trained neural network, a latent activation representation h based on the input observation x by:

receiving, by the LSTM encoder, the input observation x;

outputting, by the LSTM encoder, a context-sensitive hidden representation of the input observation x;

receiving, by the LSTM decoder, the context-sensitive hidden representation of the input observation x; and predicting, by the LSTM decoder, a sequence of words associated with the input observation x based on the context-sensitive hidden representation of the input observation x;

modify, by the contextual trainer, the latent activation representation h from the trained neural network based on one or more of the keys to generate a modified latent activation representation $h_{fair}$, wherein the one or more keys provide a uniform distribution over the sensitive customer data to eliminate bias in a first response to the customer query;

generate, by the contextual trainer, a normalized version of the modified latent activation representation $h_{fair}$;

store the normalized version of the modified latent activation representation h fair in the memory thereby increasing the capacity of the trained neural network; and output, by the contextual trainer, a predicted sequence v based at least in part on the normalized version of the modified latent activation representation $h_{fair}$, wherein the predicted sequence $\hat{y}$ comprises the first response to the customer query, the first response based on the sensitive customer data and free of the sensitive customer data.

2. The system of claim 1, wherein the trained neural network comprises the LSTM encoder in communication with the LSTM decoder, wherein the LSTM encoder is configured to receive the input observation x and provide an encoded latent activation output $h^{enco}$, wherein the LSTM decoder is configured to receive the encoded latent activation output $h^{enco}$ and a target response input y to produce a decoded latent activation representation $h^{deco}$ for input to the contextual trainer.

3. The system of claim 2, further comprising a Natural Language Processing (NLP) device in communication with the contextual trainer, wherein the input observation x comprises dialogue received from a customer, and the target response input y comprises an intermediate response generated by the Natural Language Processing (NLP) device.

4. The system of claim 1, wherein the predicted sequence $\hat{y}$ is a word-by-word concatenation based on the sensitive customer data.

5. The system of claim 1, wherein the predicted sequence v is output for review by a customer in response to the input observation x.

6. The system of claim 1, wherein the contextual trainer is configured to compute an Attention score, wherein logits of the Attention score comprise unnormalized probabilities for predicting an $i^{th}$ token of the predicted sequence $\hat{y}$.

7. The system of claim 1, wherein the trained neural network comprises one or more Seq2seq models.

8. The system of claim 1, wherein the contextual trainer occupies memory external to the trained neural network.

9. The system of claim 1, wherein the trained neural network is trained offline and is configured to receive textual data and memorize sequential patterns.

10. The system of claim 1, wherein the sensitive customer data comprises information associated with one or more of age, gender, or combinations thereof.

11. The system of claim 1, wherein the uniform distribution comprises a uniform gender distribution comprising a sequence of tokens annotated with first gender information.

12. A contextual trainer comprising:

one or more processors; and memory in communication with the one or more processors and storing instructions that, when executed by the one or more processors, cause the one or more processors to:

receive sensitive customer data;

translate the sensitive customer data into keys, wherein the keys provide a uniform distribution over the sensitive customer data to eliminate bias in a first response to a customer query;

issue one or more commands to a trained neural network thereby programming the trained neural network to formulate and revise responses to the customer query based on one or more rules;

receive, from the trained neural network, a latent activation representation h based on an input observation x received by the trained neural network, the input observation x comprising the customer query;

store a normalized version of the latent activation representation h in the memory thereby increasing the capacity of the trained neural network;

input the latent activation representation h and the keys into an Attention mechanism configured to determine unnormalized probabilities for predicting an $i^{th}$ token of a predicted sequence $\hat{y}$;

generate an Attention mechanism output responsive to inputting the latent activation representation h and the keys into the Attention mechanism;

apply a Softmax function to the Attention mechanism output to generate a Softmax output; and output the predicted sequence $\hat{y}$ based at least in part on the Softmax output, wherein the predicted sequence $\hat{y}$ comprises the first response to the customer query, the first response based on the sensitive customer data and free of the sensitive customer data.

13. The contextual trainer of claim 12, wherein the predicted sequence v comprises a revised trained neural network response adapted using the sensitive customer data.

14. A method for adapting a trained neural network response using customer contextual data while controlling bias, the method comprising:

translating, by a contextual trainer, sensitive customer data from one or more knowledge bases into keys using a contextual trainer;

receiving, by a trained neural network, an input observation x, wherein the trained neural network comprises a long-short term memory (LSTM) encoder and a LSTM decoder, and wherein the input observation x comprises a customer query;

continuously listening for, by the trained neural network, one or more commands issued by the contextual trainer, wherein the one or more commands are configured to program the trained neural network to formulate and revise responses to the customer query based on one or more rules;

generating, by the trained neural network, a latent activation representation h based on the input observation x by:

receiving, by the LSTM encoder, the input observation x;

outputting, by the LSTM encoder, a context-sensitive hidden representation of the input observation x;

receiving, by the LSTM decoder, the context-sensitive hidden representation of the input observation x; and predicting, by the LSTM decoder, a sequence of words associated with the input observation x based on the context-sensitive hidden representation of the input observation x;

modifying, by the contextual trainer, the latent activation representation h from the trained neural network based on one or more of the keys to generate a modified latent activation representation $h_{fair}$, wherein the one or more keys provide a uniform distribution over the sensitive customer data to eliminate bias in a response to the customer query;

generating, by the contextual trainer, a normalized version of the modified latent activation representation $h_{fair}$, storing the normalized version of the modified latent activation representation $h_{fair}$ in a memory thereby increasing the capacity of the trained neural network; and outputting, by the contextual trainer, a predicted sequence ŷ based at least in part on the normalized version of the modified latent activation representation $h_{fair}$, wherein the predicted sequence v comprises the response to the customer query, the response based on the sensitive customer data and free of the sensitive customer data.

15. The method of claim 14, wherein the trained neural network comprises the LSTM encoder in communication with the LSTM decoder, wherein the LSTM encoder is configured to receive the input observation x and provide an encoded latent activation output $h^{enco}$, wherein the LSTM decoder is configured to receive the encoded latent activation output $h^{enco}$ and a target response input y to produce a decoded latent activation representation $h^{deco}$ for input to the contextual trainer.

16. The method of claim 15, wherein the input observation x comprises dialogue received from a customer, and the target response input y comprises an intermediate response generated by a Natural Language Processing (NLP) device.

17. The method of claim 14, wherein the predicted sequence ŷ is a word-by-word concatenation based on the sensitive customer data received from the one or more knowledge bases.

18. The method of claim 14, wherein the customer query is received from a customer and the predicted sequence ŷ is output for review by the customer.

19. The method of claim 14, wherein the contextual trainer occupies memory external to the trained neural network.

* * * * *